O. J. WILLIAMS.
SLICING MACHINE.
APPLICATION FILED DEC. 4, 1919.
1,377,649.
Patented May 10, 1921.
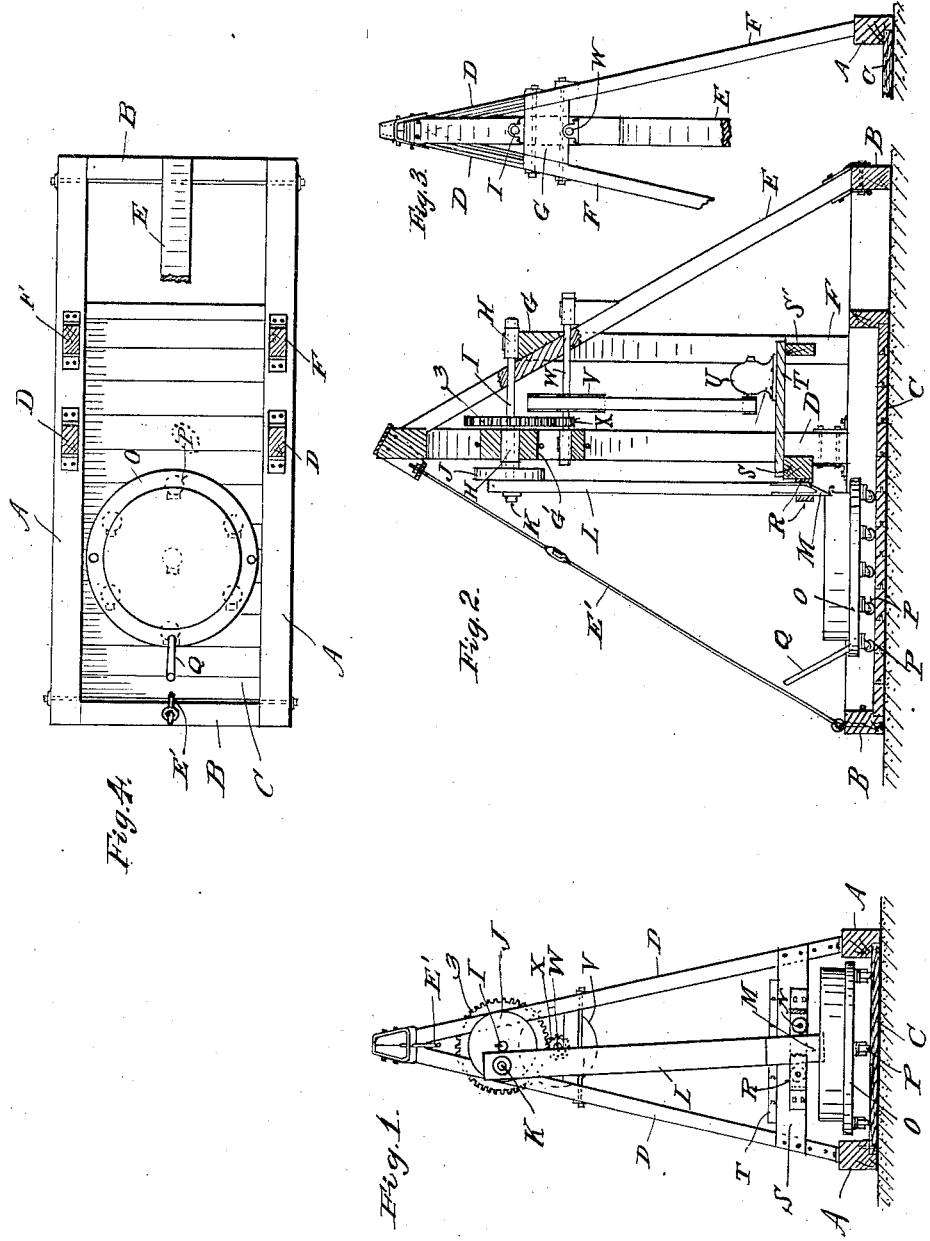
Inventor
Oliver J. Williams,
By H. M. Raisted.
Attorney.

UNITED STATES PATENT OFFICE.

OLIVER J. WILLIAMS, OF BURLINGAME, CALIFORNIA, ASSIGNOR TO WILLIAMS PATENT CRUSHER & PULVERIZER CO., OF ST. LOUIS, MISSOURI, A CORPORATION OF MISSOURI.

SLICING-MACHINE.

1,377,649.  Specification of Letters Patent.  Patented May 10, 1921.

Application filed December 4, 1919. Serial No. 342,313.

*To all whom it may concern:*

Be it known that I, OLIVER J. WILLIAMS, a citizen of the United States, residing at Burlingame, in the county of San Mateo and State of California, have invented certain new and useful Improvements in Slicing-Machines, of which the following is a specification.

This invention relates to certain new and useful improvements in slicing machines for soy bean cake and other similar material.

The main object of my invention is to provide means to slice or cut up into pieces of suitable size for further reduction in a feed mill, the pressed cakes of soy bean, cottonseed, beef scraps and such feed material which are ordinarily of considerable density, due to the heavy pressure used in extracting the oil or juice therefrom.

In the accompanying drawing on which like reference letters indicate corresponding parts: Figure 1 represents a front elevation and partial section of a machine illustrating my invention; Fig. 2, a central sectional elevation of the same; Fig. 3, a rear elevation of the upper portion of the machine; and Fig. 4, a plan view of the body or supporting frame.

Material such as cottonseed, soy bean and other vegetable which has been ground up fine, are shaped in cakes by pressure used to extract the oil therefrom, and such cakes are of considerable density and difficult to break up into sufficiently small pieces for feeding to a reducing machine for preparation as stock feed. The cakes are in the neighborhood of 4 feet in diameter, and 5 or 6 inches in thickness and generally round like a disk. It is my aim to slice or cut up such a disk in suitable sizes or pieces for further grinding in a feed mill.

The letters A and B designate respectively the side and end sills of a body frame preferably having a floor C of matched plank connecting the side sills as shown in the Fig. 1. This frame sets upon a suitable level foundation of concrete or other material so that the floor may be solid and firmly supported. Upon the side sills are erected inclined pieces D—D,—the bottom ends fastened by angle irons or otherwise to the side sills and the upper ends meeting and secured at their joint by bolts or clamps so as to form an A-frame. An inclined brace E extends from the upper end of the said A-frame to the rear end sill and is suitably fastened at both ends. A secondary A-frame is formed by the inclined pieces F—F mounted on the side sills a little to the rear of the A-frame D, and serving as lateral braces for a cross block G near the upper portion of the inclined brace E on which it is mounted as shown in Figs. 2 and 3; cross pieces G' are also provided for the A-frame D—D, and on these cross pieces are mounted boxes H—H for a horizontal shaft I that preferably passes through the inclined rear brace E. The front end of said shaft has a crank, preferably in the form of a disk J keyed to said shaft and provided with a crank pin K to which is pivoted the upper end of a pitman L, whereby a rotary motion is given to the upper end of the pitman. On the lower end of this pitman L is a knife M, square across or otherwise transversely arranged. The knife is guided in approximately a vertical motion, but with a shearing horizontal motion at the cutting edge due to the rotation of the crank and upper end of the pitman and to the controlling guides in the form of rollers N near the bottom end of the pitman as shown in Fig. 1. The farther said guides are located above the lower end of the pitman, the greater the horizontal motion of the knife at its lower end, and the consequent horizontal movement or drawing cut of the knife upon the cake that is mounted upon an adjustable table O, and provided with means for movement to and fro under said knife. A rotary motion is also given to said table by the provision of caster rollers P, mounted on the underside of said table, and rolling on the floor C before mentioned. There are projections or handles Q adapted for insertion in holes in said table as shown in Fig. 4, by which the table may be rotated and guided in its forward movement, and in fact in any horizontal direction, so as to bring every part of the cake resting on said table, under the vertically operating pitman knife. The guide rollers mentioned are supported in suitable straps R at front and rear of the end of the pitman and supported by a cross beam S on the A-frame D—D. A similar cross piece S' on the A-frame F—F, provides for a supporting platform T on which is mounted a motor U, belted to a driving pulley V on a shaft W, mounted in bearings on similar cross pieces as the shaft I. On the shaft W is a pinion X meshing with a gear 3 on the shaft I, by which the speed of the driving shaft W is reduced about in the proportion of 1 to 4 or 5, whereby the power is correspondingly increased, as exerted by the pitman knife; as practically constructed, the rotation of the shaft I is about 60 revolutions per minute, giving a cutting stroke every second. The proportion or the speed may be varied as desired, but such speed allows of the ready handling of the caster table to bring the cake under the cutting knife for further action thereon. The driving motor may be otherwise located than on the said platform.

The rear brace E before mentioned, takes the backward thrust of the reaction of the crank and pitman in cutting through the cake. A forward tie E', connecting the front end sill with the upper end of the A-frame D—D, is also provided, and a triangular framework of suitable braces, ties and supporting members is thus formed upon the body or other supporting surface, to resist the torsional and upward re-action of the knife in cutting the cake. Furthermore, by the construction shown, the device is self-contained, and may be moved to other locations where it may be desired for use; also the upper framework may be secured directly to a permanent foundation if desired, without departing from the spirit of my invention.

I claim:

1. A slicing machine comprising a horizontal body frame, a pair of parallel upright supporting frames thereon, a rear inclined brace connecting both supporting frames to the body frame, a front tie connecting said supporting frames to said body frame, a horizontal shaft mounted in said supporting frames, a crank and crank pin at one end of said shaft, an oscillating vertically operating pitman having its upper end pivoted to said crank pin, and having a knife mounted at its lower end with its edge parallel with the plane of oscillation of the pitman, a guide for the pitman adjacent its lower end, and a cutting table below said knife.

2. A slicing machine having a body frame provided with side and end sills, a front and rear A frame supported by the side sills, the rear A frame being of less height than the front one, a rear brace extending from the top of said A frames to the rear end sill, a horizontal crank shaft mounted in said A frames, a vertically operating pitman connected to the crank, said pitman having a knife at its lower end with its edge parallel with the plane of oscillation of said pitman, guiding means for the lower end of said pitman, a driving shaft and pulley on said A frames, and power transmission means between said crank shaft and driving shaft substantially as described.

3. In a machine of the character described, a horizontal body frame, a pair of upright parallel A frames, one of which is of less height than the other, an inclined brace connecting said A frames to said body frame at the rear, a tie extending from the top of said A frame to the front of said body frame, cross blocks on said A frames, bearings and a crank shaft supported by said blocks, and mechanism driven by said crank shaft and acting with upward torsional stress on said frame structure, substantially as described.

4. In a machine of the character described, the combination with mechanism comprising a knife and means for operating it, there being a horizontal plane surface below said knife and a clear space between said knife and said surface; of a horizontal table disposed between said knife and said plane surface, said table having casters resting on said surface, whereby said table may be moved in any direction beneath said knife and over said plane surface.

5. In a slicing machine, an upright frame comprising two uprights, a horizontal cross member; a guide on said cross member, a crank shaft supported on said frame, a pitman connected to said crank shaft and operating through said guide, and a cutter rigidly connected to the lower end of said pitman, said cutter being of a width not greater than said pitman whereby the cutter in its oscillation may be steadied by said guide.

In testimony whereof I have affixed my signature.

OLIVER J. WILLIAMS.